United States Patent [19]

Wu

[11] Patent Number: 5,233,448
[45] Date of Patent: Aug. 3, 1993

[54] METHOD OF MANUFACTURING A LIQUID CRYSTAL DISPLAY PANEL INCLUDING PHOTOCONDUCTIVE ELECTROSTATIC PROTECTION

[75] Inventor: Biing-Seng Wu, Taiwan, China

[73] Assignee: Industrial Technology Research Institute, Hsinchu, Taiwan

[21] Appl. No.: 877,711

[22] Filed: May 4, 1992

[51] Int. Cl.$^5$ .................. G02F 1/1343; H02H 3/00
[52] U.S. Cl. ........................... 359/59; 359/88; 257/452; 361/56; 361/111
[58] Field of Search .............. 359/72, 88, 59, 87; 257/452, 457; 361/56, 58, 91, 111

[56] References Cited

U.S. PATENT DOCUMENTS 5,068,748 11/1991 Ukai et al. .................. 359/59
5,200,876 4/1993 Takada et al. ............... 361/91

FOREIGN PATENT DOCUMENTS 0236167 9/1987 European Pat. Off. ........... 359/87
64-931 1/1989 Japan .......................... 359/87
2-210420 8/1990 Japan .......................... 359/88
3-2838 1/1991 Japan .

Primary Examiner—John Zazworsky
Assistant Examiner—Ron Trice
Attorney, Agent, or Firm—George O. Saile

[57] ABSTRACT

A method of manufacturing a liquid crystal display panel by forming a plurality of spaced scan lines, a plurality of spaced orthogonal data lines, and contact pads for each line on a substrate. Forming an electrostatic discharge line and light controlled discharge devices, each device being joined to the discharge line and a contact pad. Next illuminating the discharge devices and completing the fabrication of the array of optical display elements on the substrate associated with scan and data lines, blocking the light from discharge devices and electrically testing the array. Then again illuminating the discharge devices while assembling a second substrate over the first substrate and inserting the liquid crystal material therebetween.

32 Claims, 12 Drawing Sheets

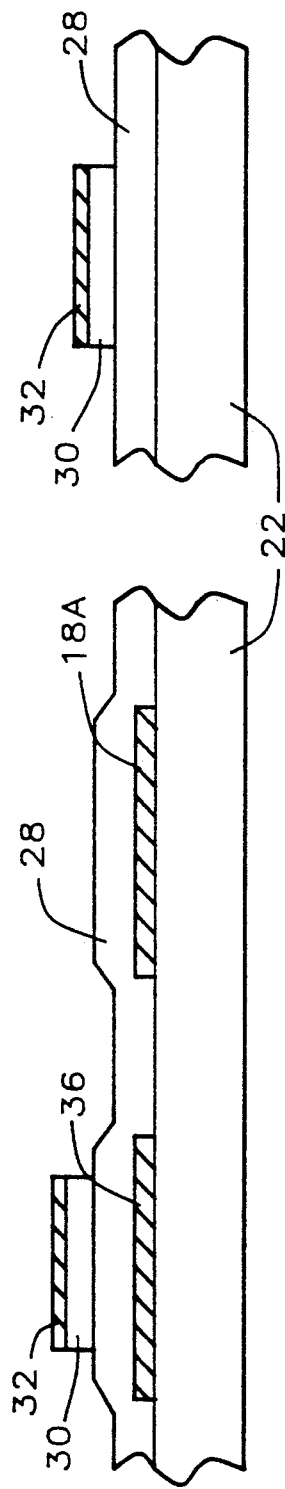
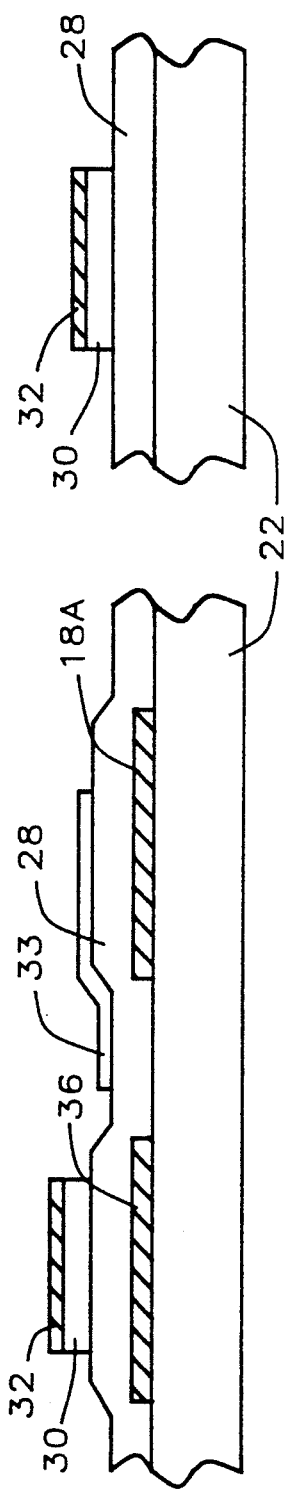

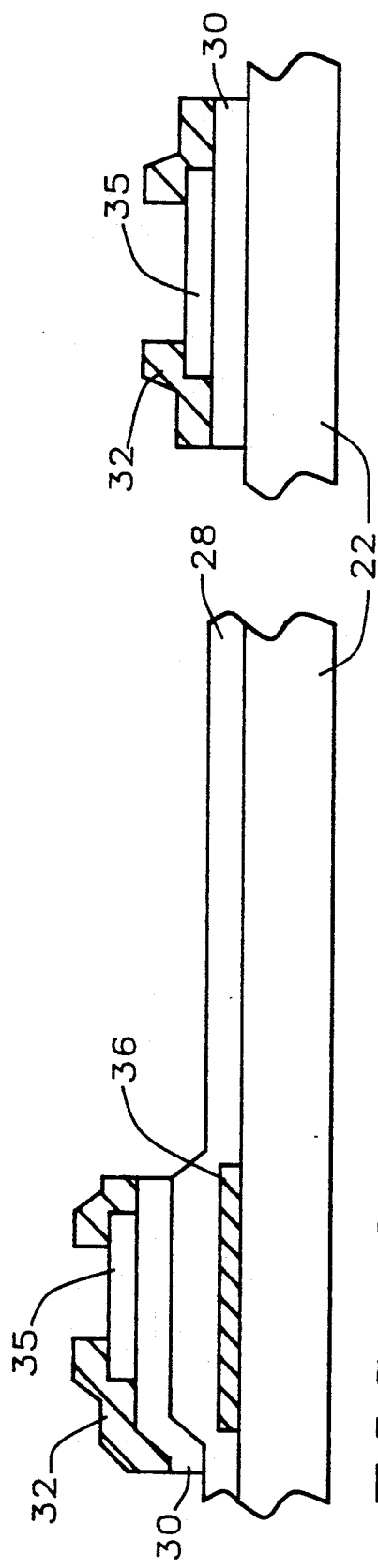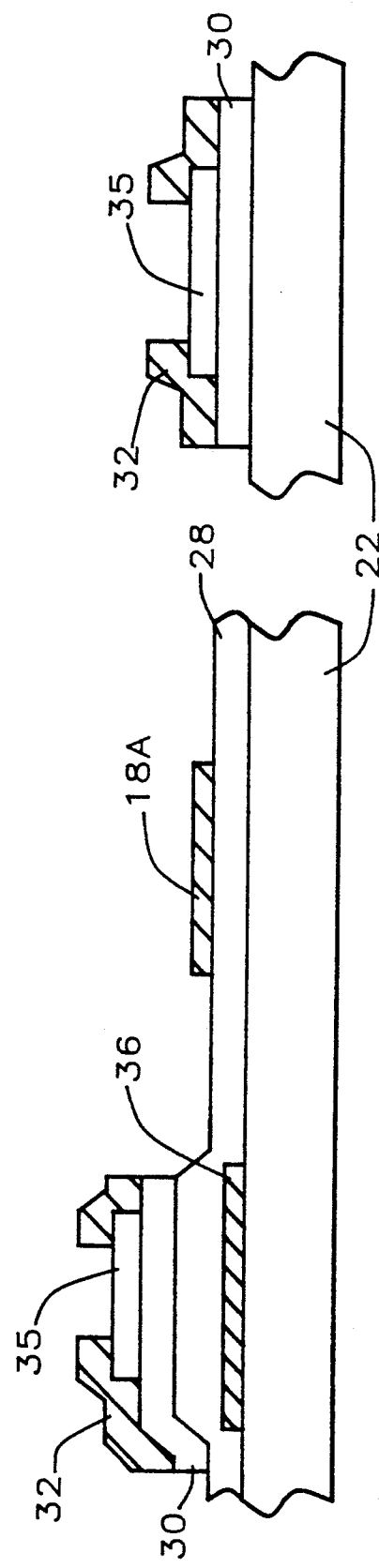

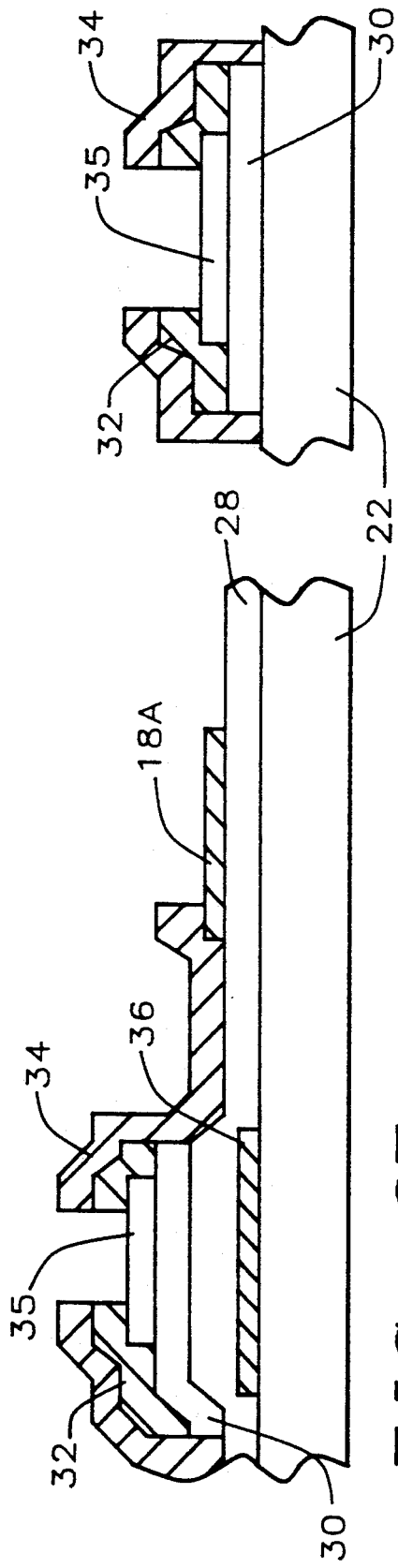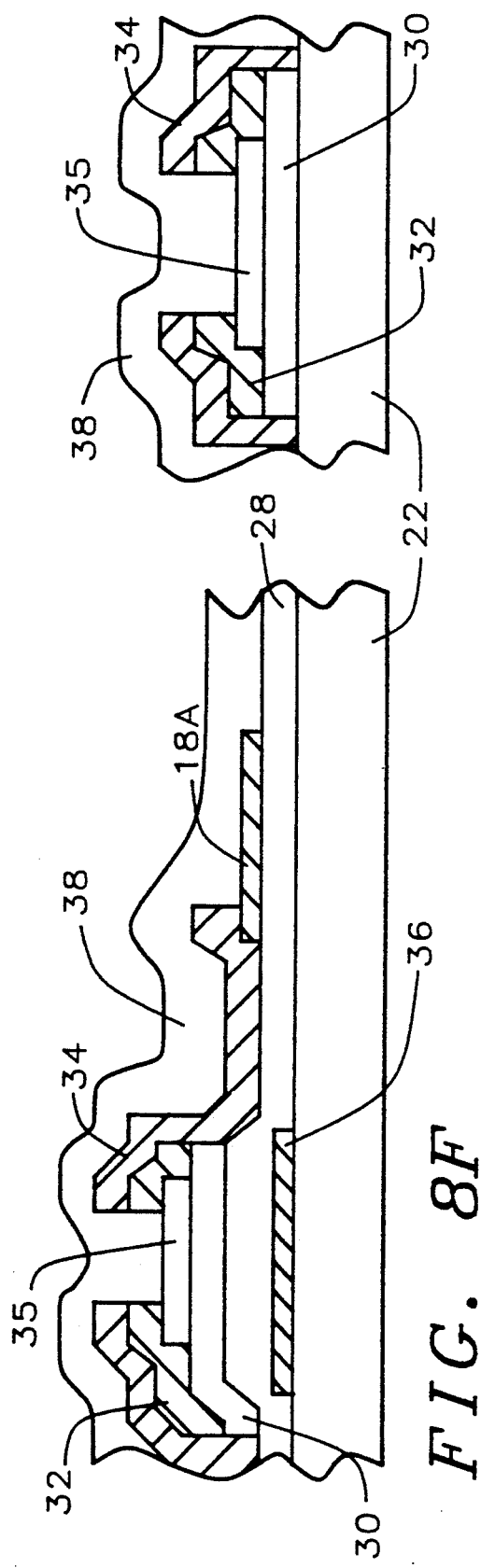

METHOD OF MANUFACTURING A LIQUID CRYSTAL DISPLAY PANEL INCLUDING PHOTOCONDUCTIVE ELECTROSTATIC PROTECTION

BACKGROUND OF THE INVENTION (1) Field of the Invention

The invention relates to an improved method of making an active matrix liquid crystal (AMLC) display panel, and in particular to a method of manufacturing an Liquid Crystal Display (LCD) panel that more effectively and efficiently eliminates or reduces the effect of electrostatic damage during processing steps.

(2) Description of Prior Art

Modern flat panels LC displays have found wide usage, particularly in small portable computers capable of operating on batteries. Such displays in general have a layer of liquid crystal material, that is capable of changing its optical characteristics when exposed to an electric field. The LC material is usually sandwiched between two transparent or semitransparent panels. One of the panels has a matrix consisting of a set of spaced parallel conductive scan lines, and a second set of orthogonal spaced parallel conductive data lines. The areas defined by two adjacent scan lines and two adjacent data each contains a transparent electrode that define a pixel. An array of electronic switch elements usually thin film transistors, associated with the scan and data lines, operate to selectively apply an electrical potential to the electrodes. The applied potential influences the liquid crystal material in the immediate area. The potential is applied across a small electrode on one substrate to a common conductive electrode on the opposed panel. FIG. 1 depicts a schematic diagram of a single cell of a LC display panel. A field effect transistor (FET) 10, normally a very small thin film transistor having an amorphous or polycrystalline silicon layer, has the gate connected to a scan line 12, and the source joined to a data line 14. The drain is connected to the transparent pixel electrode which is the upper plate of the capacitor 16. The hatched area of the capacitor 16 designates the liquid crystal material between the panels, and the lower plate of the liquid crystal capacitor 16 designates the opposed common electrode on the opposed panel. Storage capacitor 18, which is connected in parallel with the capacitor 16 stores a potential applied to the liquid crystal layer. Capacitor 18 may be built into the lower panel. This capacitor may be omitted. In operation, the transistor 10, in response to signals on the scan and data lines, is selectively turned on to influence the liquid crystal material and thereby selectively produce an opaque area. The panel is normally back lighted. An image can thus be formed on the display panel in response to signals applied to the scan and data lines through contact pads (not shown) associated with the lines.

In FIG. 2 there is illustrated a sequence of process steps for fabricating a TFT panel, known to the prior art. As indicated in blocks 11 and 13 a first substrate, normally of glass, that is either transparent or translucent, is prepared and an active matrix array that includes the scan and data lines, contact pads, thin film transistors, transparent electrodes, capacitors, etc. are fabricated. Then a second transparent or translucent glass substrate, as indicated by blocks 15, 17 and 19 are prepared with a common electrode and possibly color filters as is known in the art. Blocks 21, 23, 25, 27, 29 and 31 indicate known process steps which will be described in more detail later in this description.

In performing the indicated process steps for assembling the LCD panel, very troublesome problems are caused by the generation of static electricity. Electrostatic charges are developed when any two substances (solid, liquid or gas) make contact and are then separated. These electrostatic charges can be great enough to damage or cause the malfunction of electronic parts, assemblies and equipment during their discharge to ground or to another object. During the manufacturing of TFT liquid crystal flat panel displays, electrostatic energy may be generated by many of the process steps, for example the spin drying process for the TFT array and the alignment treatment for the LCD process. During the production of thin film transistor array, the spin drying process is necessary to dry the glass substrate after every wet process, the glass substrates are loaded into a spin roller and rotate the roller with the substrates, the friction between glass substrate and the air generate the electrostatic charges. Alignment treatment 21 for LCD fabrication process also generates electrostatic charges. A thin alignment layer such as polyimide is coated on the glass, and the surface is rubbed with something, usually like a soft cloth, in the same direction as the liquid crystal molecules will be aligned. Thus the ESD (electrostatic discharge) protection is necessary before finishing the whole TFT and LCD fabrication processes.

Even a small amount of electrostatic energy can severely damage the dielectric films of very small transistor elements and cross-over regions of matrix lines. It is known to provide a conductive line surrounding the matrix that is joined to each of the contact pads connected to the scan and data lines. This line must later be removed before the display panel is tested and put into operation. The shorting of the data pads places the elements at the same potential and eliminates or minimizes damage due to electrostatic discharge. However, since the production yield of the active matrix array is quite low, the arrays must be tested to separate the defective one before they are processed further. The shorting line prevents the electrical testing of the array. If it is removed for the testing, it leaves the substrate with its array vulnerable for the later process steps which generate static electricity.

The shorting ring is most conveniently formed when operations for producing the matrix array is formed, which is before the tests are applied. Thus, it would be advantageous to form the shorting ring as the matrix array is formed and to render the shorting ring operative and non-operative at various stages of manufacture and testing of the panel display. In the prior art this concept is not known.

SUMMARY OF THE INVENTION

It is accordingly the object of the present invention to provide a new process for manufacturing an active matrix liquid crystal display panel which reduces the probability of damage caused by electrostatic energy.

Another object of the present invention is to provide a TFT LCD which has the ESD protection ring during the whole TFT and LCD processes, and the testing step can be applied before the LCD processes.

Yet another object of the invention is to provide an electrostatic discharge ring structure for a liquid crystal display panel that more effectively protects the array during the manufacture and assembly of the display panel.

The method of manufacturing a display panel involves forming a plurality of spaced scan lines, and a plurality of spaced orthogonal data lines on a first substrate. Pads are formed for every data line and scan line. An electrostatic discharge line is formed about the pads, and light controlled electrostatic discharge devices are connected to each pads and to the discharge line. An array of optical display elements are formed on the substrate that are associated with the scan and data lines. Blocking out the light from the discharge devices, thereby electrically isolating the data pads from the discharge line, permits electrically testing the array of optical display elements. The discharge devices are then illuminated to thereby short the data pads, while assembling the panel substrates. Light is blocked from the discharge devices to again isolate the data pads from the discharge line.

In a second embodiment, a second discharge line is used to protect the active matrix array during the array fabrication process. The pads are connected to the second discharge line. The second discharge line is located outside the first discharge line and is removed before the liquid crystal display process to test the active matrix array.

The present invention makes possible a process to more easily and effectively eliminate the adverse influence exerted by static electricity on the very sensitive matrix of active elements and lines of LC display panel manufacture.

BRIEF DESCRIPTION OF THE DRAWINGS

FIGS. 7a through 7g is a sequence of cross-sectional views, in broken section, which illustrates a first embodiment process of simultaneously making a thin film transistor array and electrostatic discharge protection devices.

FIGS. 8a through 8f is a sequence of cross-sectional views which illustrates a second embodiment process for simultaneously making a thin film transistor array and electrostatic discharge protection devices.

DETAILED DESCRIPTION OF THE PREFERRED EMBODIMENT

Figure 5:
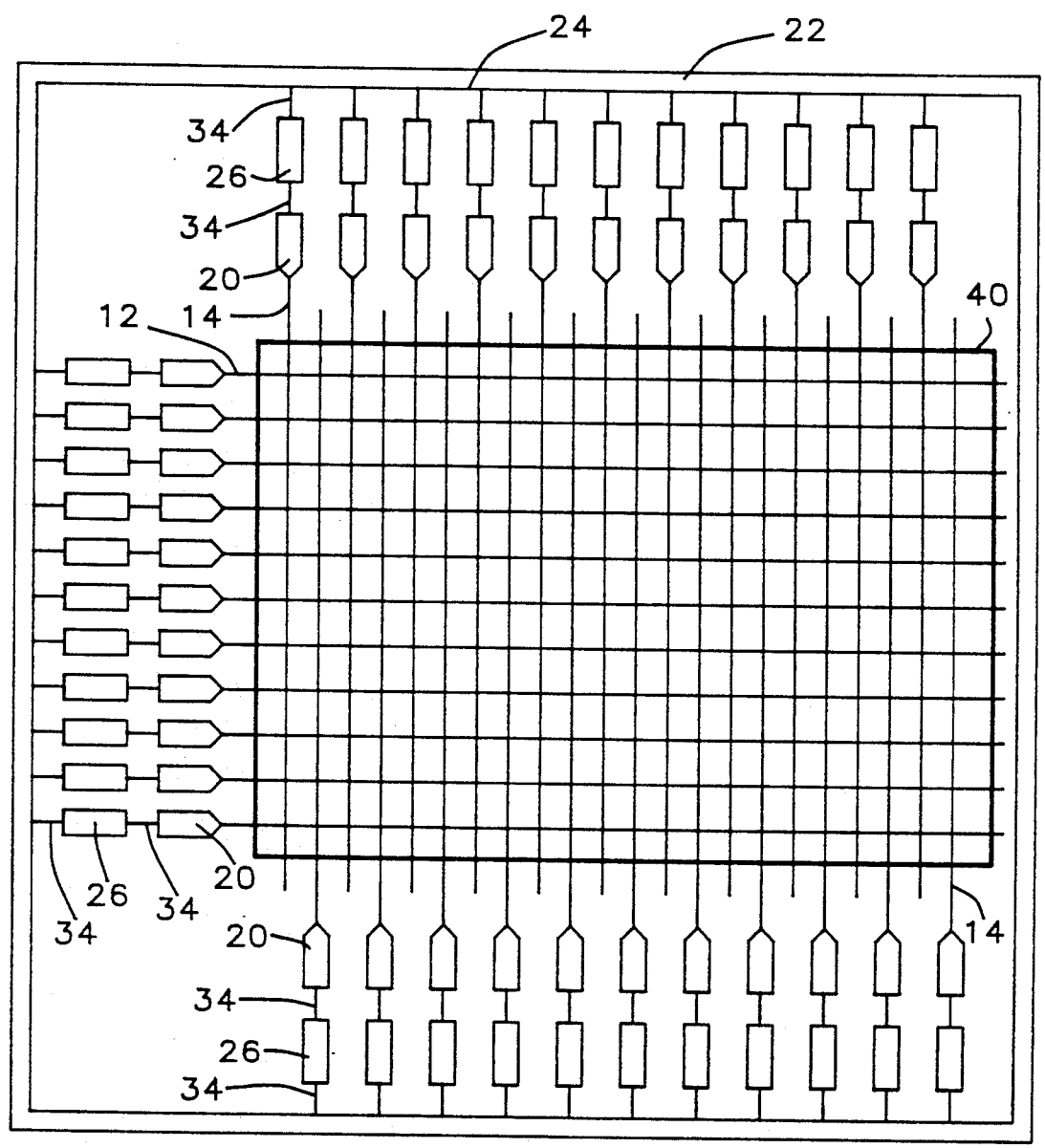
FIG. 5 is a simplified top plan view of an array of scan and data lines which illustrates the elements and their arrangement used in the practice of a first embodiment of the process of the invention.

Referring to FIG. 5, there is disclosed as first embodiment of the LCD panel structure and process of making the panel of the invention. In the method of manufacturing a thin film transistor liquid crystal display panel, a plurality of spaced parallel conductive scan lines 12 are formed on substrate 22, using conventional deposition and patterning techniques. Substrate 22 can be any suitable type of substrate, typically a glass plate. After a suitable insulating layer has been deposited over scan lines 12, a plurality of spaced, parallel orthogonally arranged conductive data lines 14 are deposited. Data pads 20 associated with lines 14 can be deposited simultaneously. An electrostatic discharge line or ring 24 is formed that surrounds the data pads 20, and is spaced therefrom. A plurality of light controlled electrostatic discharge devices 26, are fabricated which interconnect each of the pads 20 with the electrostatic discharge line 24. Devices 26 function to either electrically isolate data pads 20, or alternately short all the pads 20 and their associated scan and data lines through discharge ring 24. Devices 26 are either non-conducting or conducting, depending on whether they are blocked out or illuminated.

The conductive data lines 14, a plurality of spaced, lines parallel with each other and orthogonally arranged with scan lines 12, are deposited. Scan lines 12 can be formed simultaneously with the gate electrode of the transistors, and data lines 14 can be formed simultaneously with the source/drain electrodes of the transistors. Contact pads 20 can be formed simultaneously with the transparent pixel electrode 33 or the data lines 14. The insulating layer of the crossovers of the data lines 14 and scan lines 12 is the gate insulating layer of the transistor.

Figure 6:
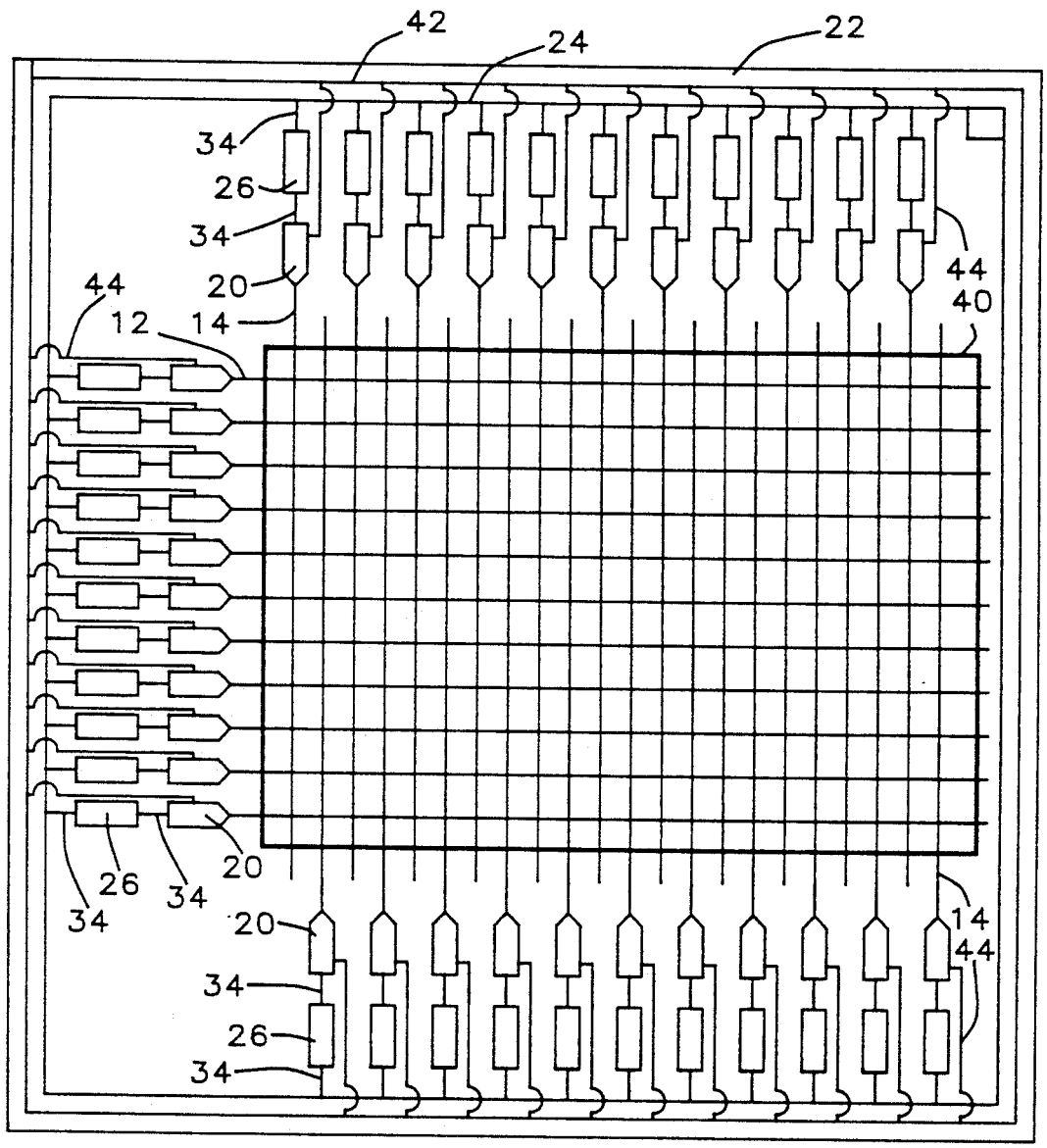
FIG. 6 is a simplified top plan view of any array, similar to FIG. 5, but including a second embodiment of a discharge line structure.

Referring now to FIG. 6, there is shown a second embodiment of the LCD panel structure and manufacturing process for making such a panel according to the invention. This second embodiment is generally similar to the first embodiment except that it provides an alternate structure when the discharge devices cannot be effectively illuminated. This condition may persist during various process steps used to fabricate the array of optical display elements, such as spin drying, etc., when sufficient illumination to the discharge devices 26 can not be provided to assure dependable conduction. If there is insufficient illumination, the data pads 26 would not be shorted to discharge ring 24 in the first embodiment, possibly resulting in damage to the array. In the structure/method illustrated in FIG. 6, an additional electrostatic discharge line or ring 42, outside ring 24, is provided. Individual lines 44, isolated from ring 24 join the data pads 20 to ring 42. The second embodiment process is similar to the first, i.e. address lines 12, data lines 14, data pads 20, a first elecrostatic line 24, and discharge devices 26 are formed. In this process a second electrostatic line 42 and connecting lines 44 are formed at the same time. The first embodiment required that discharge devices 26 be illuminated as the optical display devices were fabricated. However, in this second embodiment, this illumination is not required. The second discharge ring 42, and lines 44 perform the function of shorting the pads 20. After the optical display elements have been fabricated, the discharge ring 42 is removed, and the process proceeds similar to the first embodiment, i.e. the blocking the discharge devices 26, testing the array, removing the blocking and illuminating discharge devices 26 and applying the liquid crystal material. After the second substrate is assembled and sealed, and the data pads 20 joined to suitable driver circuitry, the discharge devices must again be blocked.

Figure 7D:
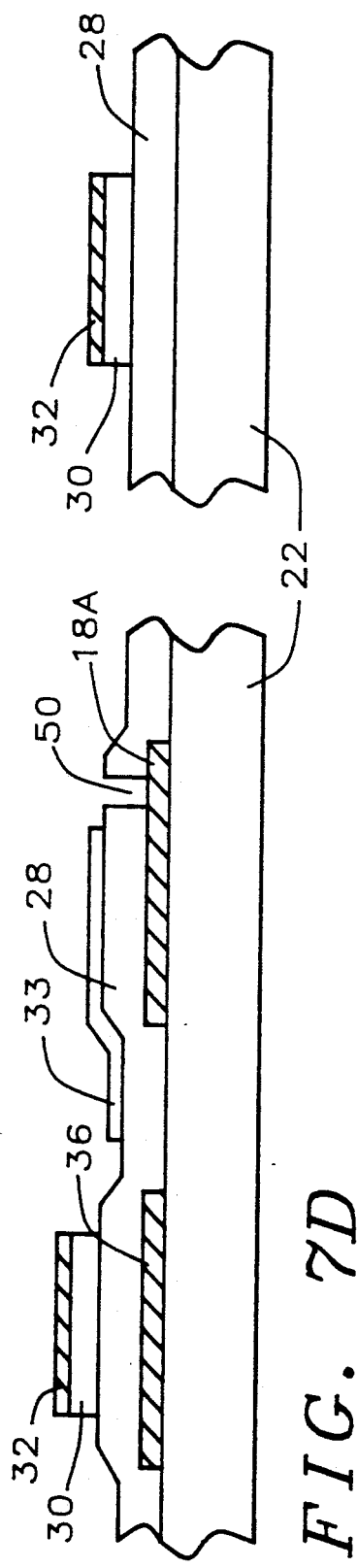
Figure 7E:
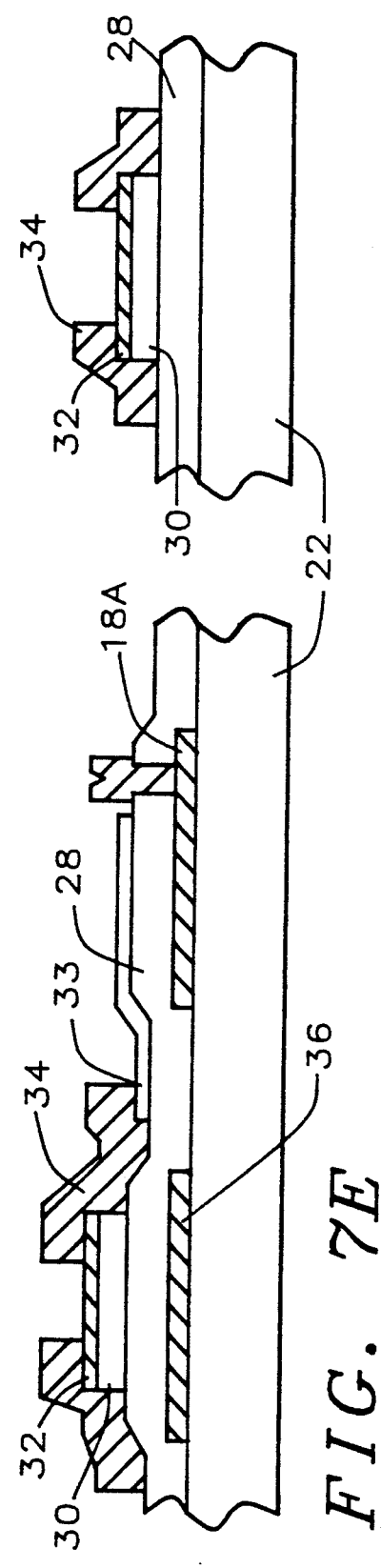
Figure 7F:
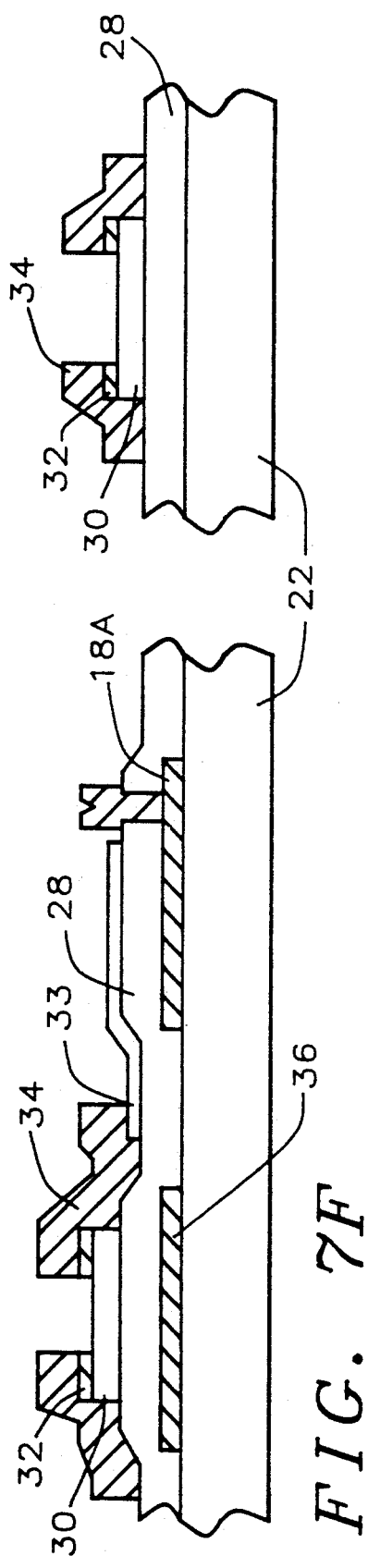
Figure 7G:
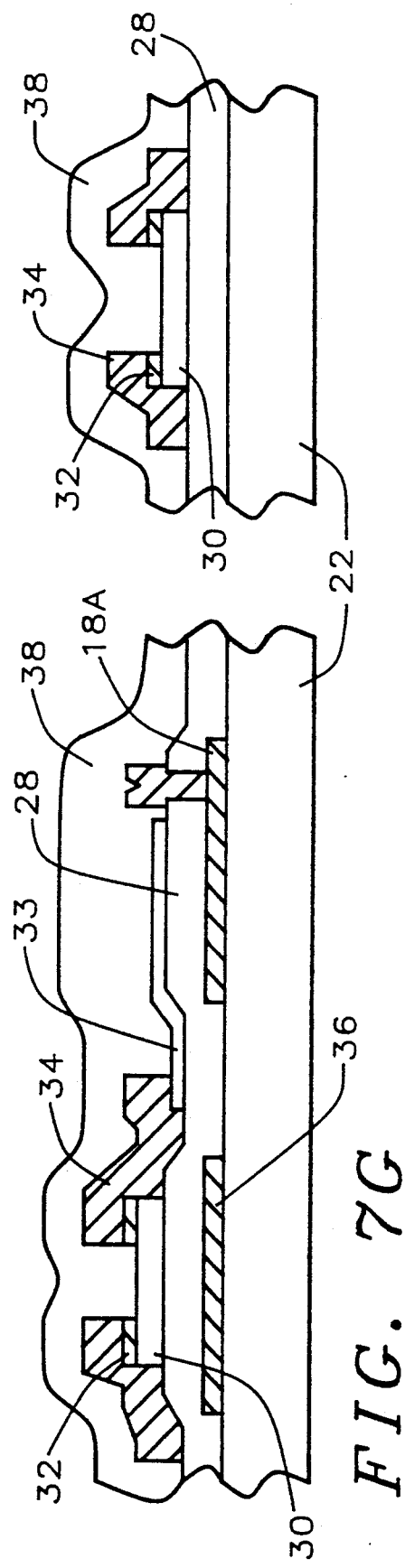

The light controlled discharge devices 26 and the thin film transistors can be produced simultaneously. FIGS. 7a through 7g show the process of making these devices. The first step of the process comprises forming, on a glass substrate or other transparent substrate 22, a gate 36 of the transistor, an electrode 18a of the capacitor 18 and the scan lines 12 (not shown), using well known methods of lithography including masking and etching. Then, consecutively, a gate insulating layer 28, amorphous silicon (a-Si:H) layer 30, and a doped amorphous silicon (N+ a-Si:H) layer 32, are deposited by plasma enhanced chemical vapor deposition techniques. Then, the active regions of the transistor and the photosensitive device are formed by lithography. As shown in FIG. 7c, the transparent pixel electrode 33, preferably made of Indium Tin Oxide (ITO) of display element and the pads 20 for data lines 14 and scan lines 12 are formed. Note that the pads 20 for data lines 14 and scan lines 12 could be formed simultaneously with data lines 14. After opening a contact for each of the scan lines 12, layer 34 is deposited and the source/drain electrodes of the TFT, contact electrodes of the discharge devices 26, and data lines 14 of the panel are formed by deposition and lithography/etching processing. The N+ a-Si:H layers are etched, as seen in FIG. 7f between the source electrode and the drain electrode of the TFT and between the two electrodes of the photosensitive electrostatic discharge device 26. Finally, the passivation layer 38 is deposited over the upper surfaces. This layer may be, for example silicon nitride and deposited by plasma enhanced chemical vapor deposition.

The shorting ring can be composed of Metal I and formed when can lines and gates are formed. The Metal II can be the material of the data lines and source/drain electrodes and may be formed simultaneously. The transparent ITO is the material of the pixel electrode.

The process of forming the thin film transistor is described to indicate where and when the discharge devices and discharge lines, which are key parts of the invention can be fabricated most effectively in the process.

Figure 3:
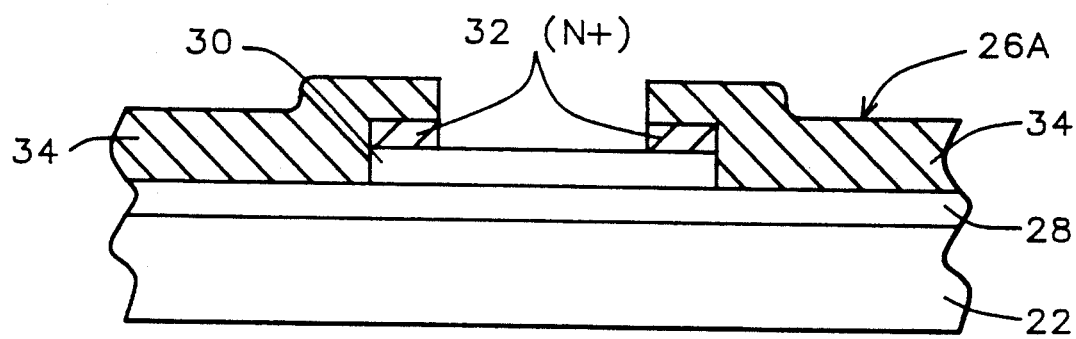
FIG. 3 is a sectional view, in greatly enlarged scale and in broken section, of a single light controlled electrostatic discharge device used in the manufacturing.

FIG. 3 illustrates separately an embodiment of a discharge device 26A used in the invention. The device is similar to the device illustrated in the right sides of FIGS. 7a through 7g, which illustrates how it and the TFT may be formed.

Figure 4:
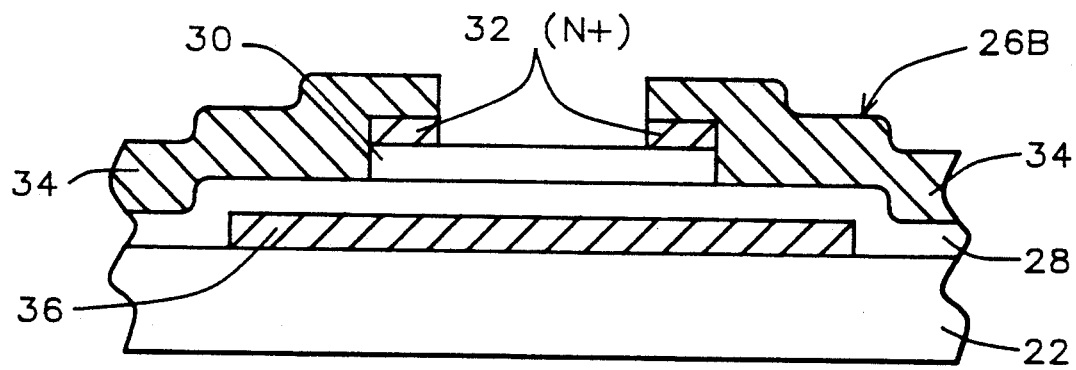
FIG. 4 is a sectional view of an alternate embodiment of a discharge device provided with a light blocking element.

FIG. 4 depicts a light controlled device 26B similar to the device 26A, except that a blocking pad 36 is provided beneath layer 30 to shield it from illumination from beneath substrate 22. Device 26B is fabricated in basically the same manner as device 26A, described previously.

Figure 8A:
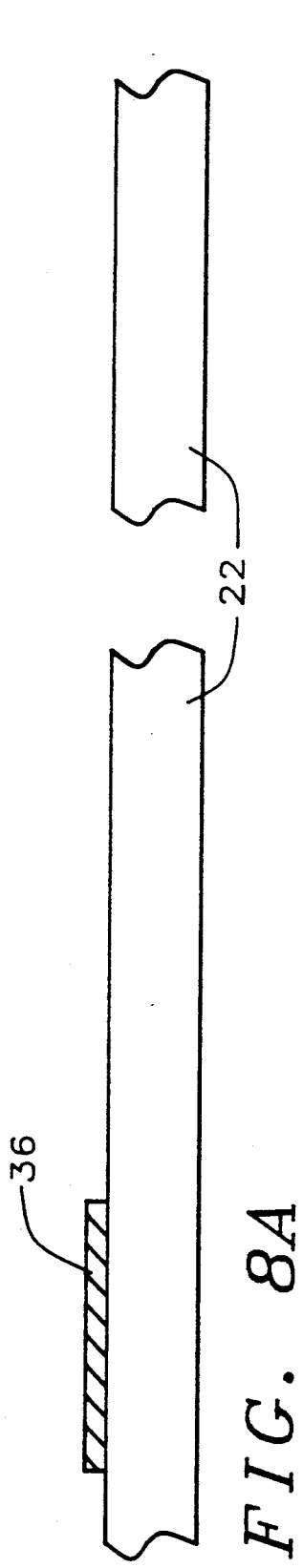
Figure 8B:
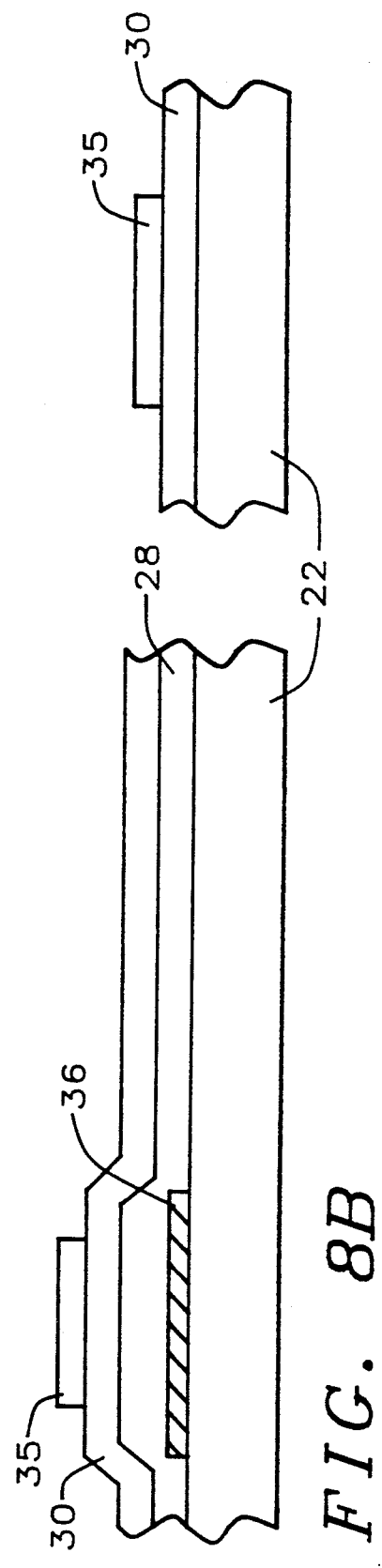

Referring now to FIGS. 8a through 8f, there is illustrated an alternate embodiment for fabrication of the devices of FIGS. 7a through 7g. As shown in FIG. 8a, a metal layer 36, preferably of chromium is deposited and patterned on substrate 22 to form the gate electrode of the TFT. Insulating layer 28 is deposited and composed, preferably of silicon nitride. An amorphous silicon or polysilicon layer 30 is deposited and a silicon nitride layer 35 deposited over layer 30 and patterned to leave areas over the TFT and the discharge device. A doped amorphous silicon layer 32 is deposited over layer 30 and patterned to form contacts to the end portions of areas of layer 30, as shown in FIG. 8c. Terminals are formed to the source and drain of the TFT and to the ends of the discharge device by the depositions and patterning of the conductive layer 34, which is preferably composed of aluminum/chromium.

Figure 1:
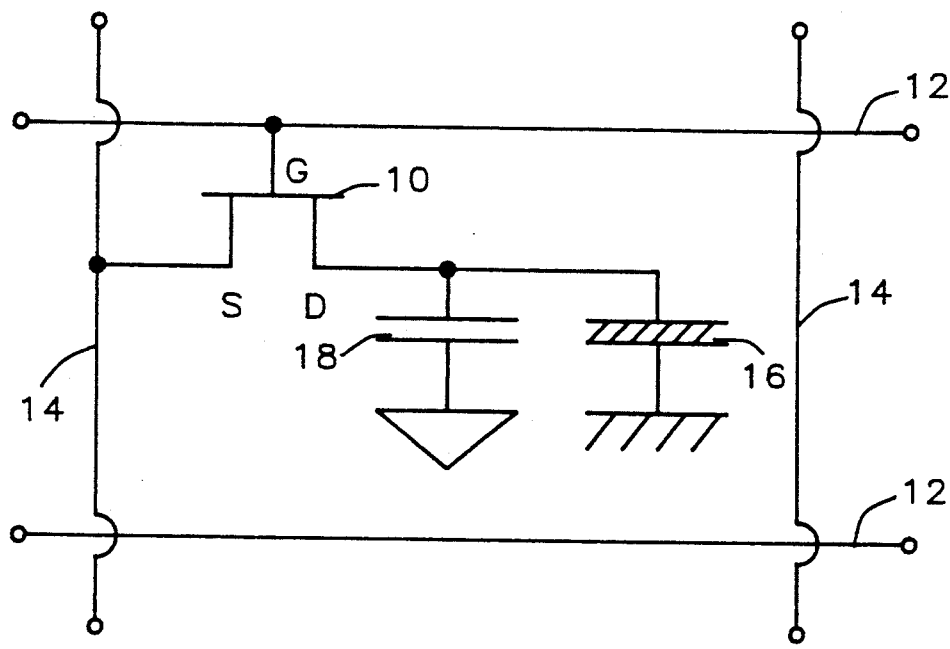
FIG. 1 is a schematic diagram of a single cell of a typical thin film transistor (TFT) liquid crystal display panel.
Figure 2:
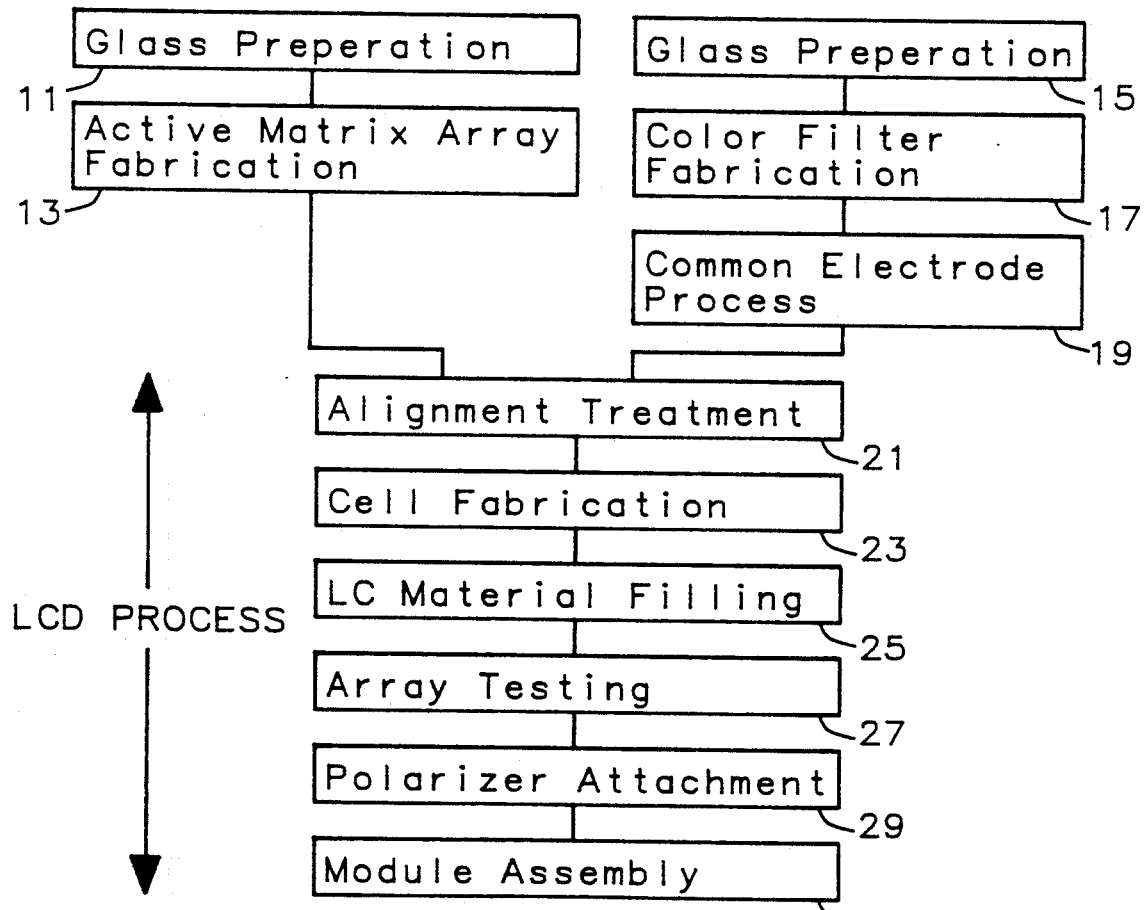
FIG. 2 is a flow diagram depicting a conventional process flow for manufacturing a TFT LCD display panel.
Figure 9:
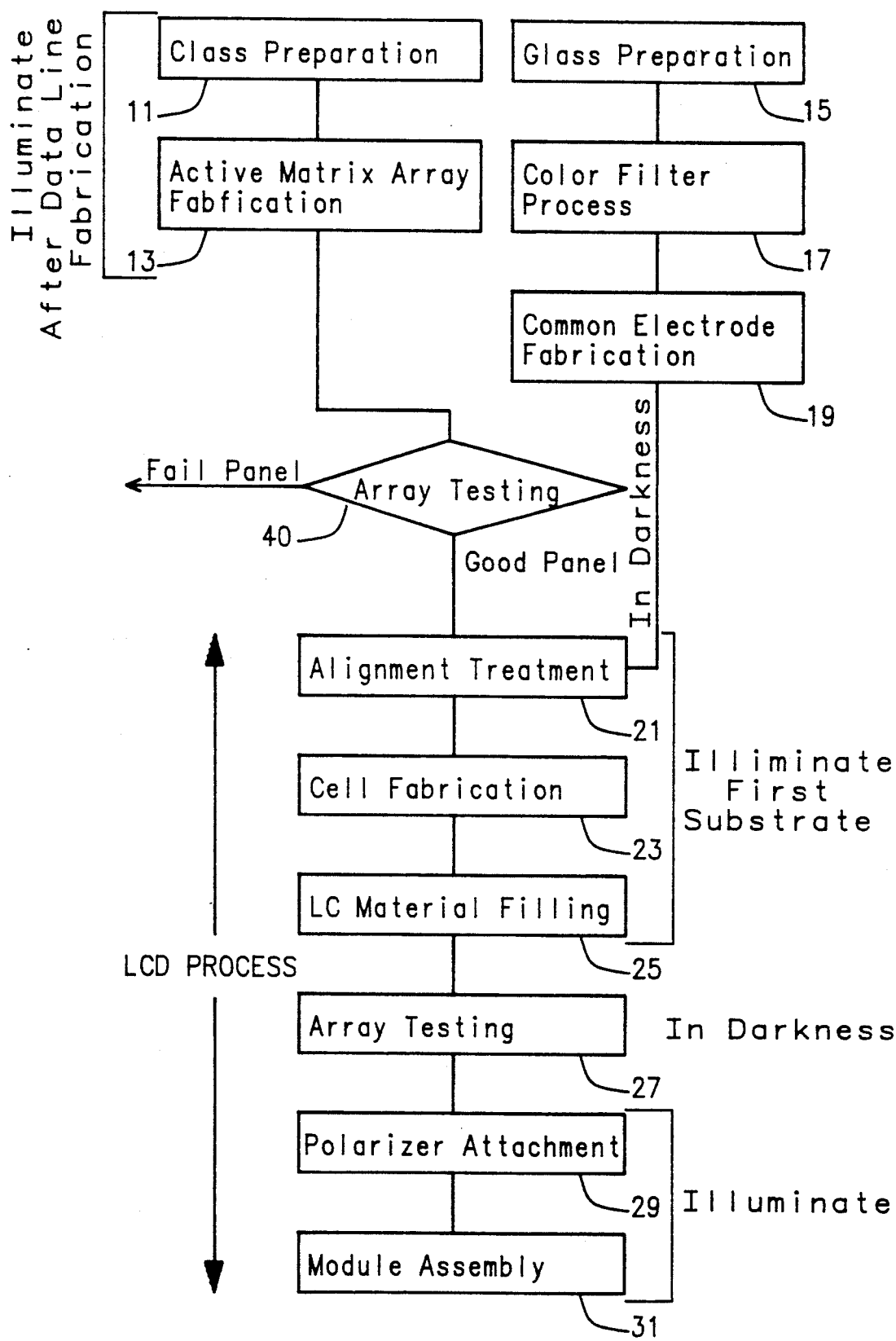
FIG. 9 is a flow diagram which illustrates a first method embodiment of the fabrication, testing and assembling a display panel of the invention.

Referring now to FIG. 9, there is depicted a flow chart setting forth the steps in the first embodiment of the invention. Note that the blocks that correspond to the blocks on FIG. 2 have the same numbers. These process steps have been explained previously in regard to FIG. 2.

As indicated in FIG. 9, in fabricating the first substrate having the thin film transistor array, discharge devices 26 and the electrostatic discharge line 24 as shown in FIG. 5, the substrate is illuminated during the process steps for forming the active matrix array, as indicated by block 13. Illumination shorts the scan and data lines to the discharge line 24 thereby dispelling any static electricity formed during the process steps. After the matrix array is completed it must be electrically tested, since the production yield of the TFT array is normally quite low. If the array is defective, it must be either repaired or discarded, rather than assembled with the second substrate and completed to produce an expensive and useless display panel. In order to test the TFT array the pads of the scan lines and data lines must be electrically isolated from each other. Therefore, the discharge devices 26 must be blocked out, that is prevented from being illuminated. This can be achieved by putting the first glass substrate into a dark testing box. This testing step in darkness is indicated on FIG. 9 by block 40. If the substrate tests are favorable, the fabrication of the display panel proceeds by combining the second substrate fabricated by steps 15, 17 and 19, and proceeding with steps 21 through 31.

After the electrical tests, the tests including the short tests of every scan line, to every data line, open tests for every scan line and every data line, the intense light is illuminated to the first glass substrate to again make the discharge devices conductive, and short the pads through ring 24. A thin alignment layer such as polyimide is coated on each glass, and the surface is rubbed with something, usually a soft cloth, in some direction as the LC molecules will be aligned. In order to form a twisting angle between both glasses, such rubbing directions are different from each other. During rubbing the first glass, the intense light is illuminated from the back side of the glass, and the discharge devices are turned on, thus the generated electrostatic charges due to rubbing are discharged through the discharge devices. Then, on one side of the glass, spacing materials are uniformly scattered on the glass followed by printing of the adhesive material to make the cell. The two glasses are now assembled to make a LC cell with proper alignment technique between the two glasses.

The liquid crystal material is injected into the cell through the filling opening hole. Usually this process is done in a vacuum chamber. After completion of the LC cell fabrication process, the TFT array must be electrically tested again. The pads of scan lines 12 and data lines 14 must be electrically isolated from each other. The discharge devices must be blocked out again, that is prevented from being illuminated. This can be achieved by putting the LC cell into a dark testing box.

Finally, the LC cell is tested with external components. Plastic polarizers are carefully adhered to both sides of the LC cell. Driving and peripheral circuit of large scale integration is connected to the scan pads and the data pads of the LC cell. The intense light is illuminated to the first glass except for the testing processed. The static electricity is prevented from doing damage to the array because all the elements are at the same potential.

In steps 21, 23, 25, where the possibility of generating static electricity exists, the substrate is illuminated to again short the scan and data lines through line 24, as indicated in FIG. 9. As indicated by block 27, the array in the assembly of substrates is tested in darkness to isolate the scan and data lines.

If the display panel tests good, the panel is again illuminated and the process steps indicated by blocks 29 and 31 are completed.

Figure 10:
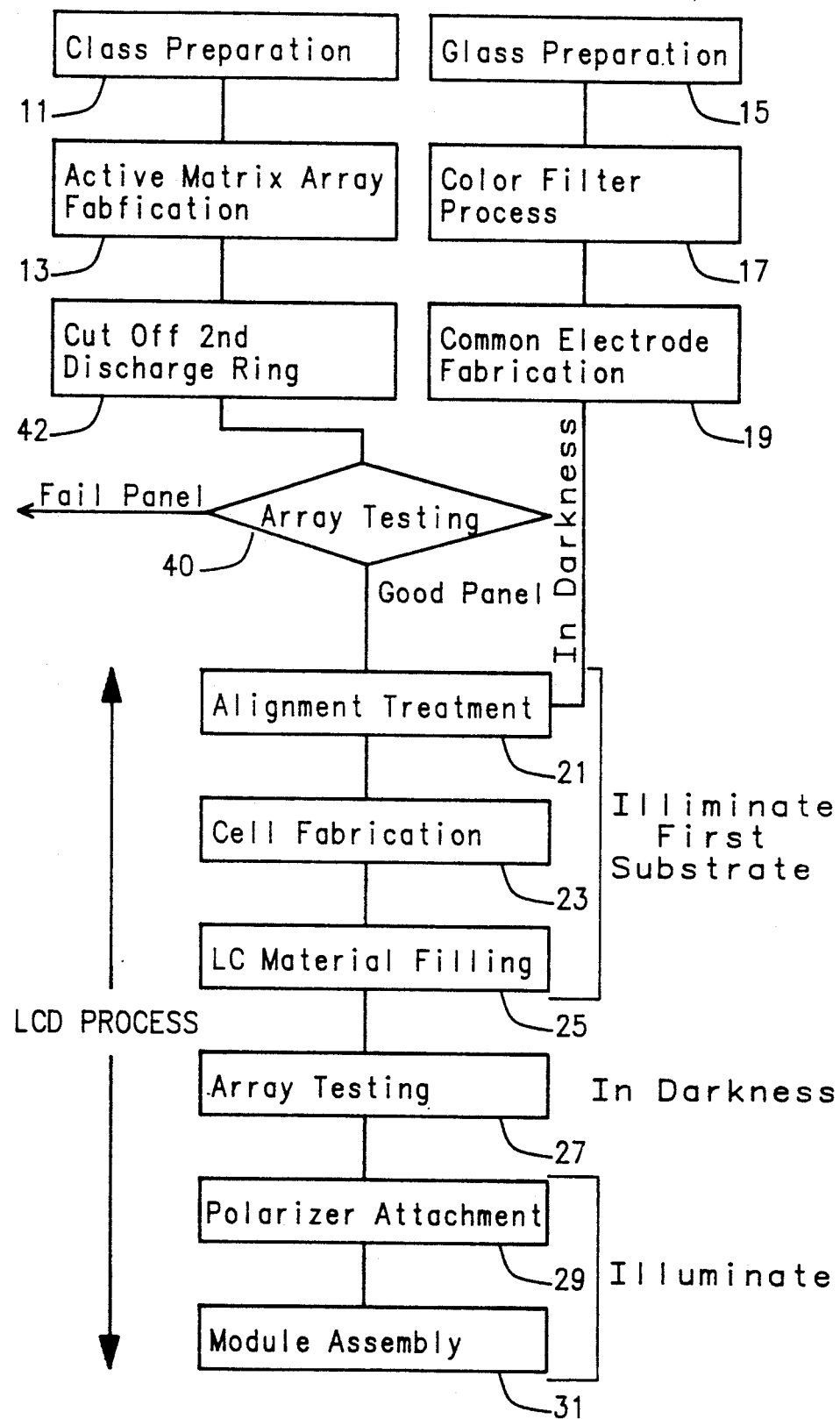
FIG. 10 is a flow diagram which illustrates a second method embodiment of the fabrication, testing and assembling a display panel of the invention.

FIG. 10 depicts the process of the second embodiment of the invention. The substrate supporting the TFT array, fabricated with the discharge line 24 and discharge devices 26, and a second discharge line 42 that is directly joined to the pads 20 and illustrated in FIG. 6 is used in this process embodiment. The process steps are performed while the substrate is illuminated for the same reasons described for the first embodiment. However, the scan and data lines are shorted by line 42 so that there is no requirement that the discharge devices be illuminated. This shorting arrangement may be necessary where the discharge devices can not conveniently be illuminated to activate the discharge devices. The shorting line 42 must be removed, as by cutting the glass substrate before the array is tested, as indicated by block 42. The test of the fabrication process is similar to the process of the first embodiment, describe previously.

While the invention has been particularly shown and described with reference to the preferred embodiments thereof, it will be understood by those skilled in the art that various changes in form and detail may be made therein without departing from the spirit and scope of the invention.

What is claimed is:

1. A substrate for a liquid crystal display panel including a thin film transistor array comprising:
   a flat transparent substrate;
   a plurality of spaced, parallel scan lines, and a plurality of spaced orthogonally arranged parallel data lines on said substrate;
   a plurality of contact pads adjacent to the periphery of said substrate that are electrically connected to said scan lines and said data lines;
   an array of thin film transistor display elements on said substrate that is operationally associated with said scan lines and said data lines;
   a first annular electrostatic discharge line on said substrate that is located adjacent the periphery of said substrate outwardly of said contact pads;
   a second annular electrostatic discharge line on said substrate located inwardly of said first discharge line and electrically connected to each of said contact pads; and
   a plurality of light controlled electrostatic discharge devices adjacent said pads, each of said electrostatic discharge devices having two terminals with one terminal joined to said first electrostatic discharge line, and with the other terminal joined to one of said pads.

2. The substrate of claim 1 wherein each of said light controlled electrostatic discharge devices include a stripe of silicon material, and a layer area of heavily doped silicon material on each end of said stripe, and conductive metal terminals joined to said areas.

3. The substrate of claim 2 wherein said silicon material of said stripe is polycrystalline silicon.

4. The substrate of claim 2 wherein said silicon material of said stripe is amorphous silicon.

5. The substrate of claim 2 wherein both said stripe and layer areas are polycrystalline silicon.

6. The substrate of claim 2 wherein both said stripe and layer areas are amorphous silicon.

7. The substrate of claim 1 wherein said discharge device includes a photoconductor which when illuminated with light allows electrical conduction and when maintained dark does not allow electrical conduction.

8. A substrate for a liquid crystal display panel including a thin film transistor array comprising:
   a flat transparent substrate;
   a plurality of spaced, parallel scan lines, and a plurality of spaced orthogonally arranged parallel data lines on said substrate;
   a plurality of contact pads adjacent to the periphery of said substrate that are electrically connected to said scan lines and said data lines;
   an array of thin film transistor display elements on said substrate that is operationally associated with said scan lines and said data lines;
   an annular electrostatic discharge line on said substrate that is located adjacent the periphery of said substrate outwardly of said contact pads; and
   a plurality of light controlled electrostatic discharge devices adjacent said pads, each of said electrostatic discharge devices having two terminals with one terminal joined to said electrostatic discharge line, and with the other terminal joined to one of said pads.

9. The substrate of claim 9 wherein each of said light controlled electrostatic discharge devices include a stripe of silicon material, and a layer area of heavily doped silicon material on each end of said stripe, and conductive metal terminals joined to said areas.

10. The substrate of claim 9 wherein said silicon material of said stripe is polycrystalline silicon.

11. The substrate of claim 9 wherein said silicon material of said stripe is amorphous silicon.

12. The substrate of claim 9 wherein both said stripe and layer areas are polycrystalline silicon.

13. The substrate of claim 9 wherein both said stripe and layer areas are amorphous silicon.

14. The substrate of claim 8 wherein said discharge device includes a photoconductor which when illuminated with light allows electrical conduction and when maintained dark does not allow electrical conduction.

15. A method of manufacturing a liquid crystal display panel comprising:
   forming a thin film transistor array on a first glass substrate, said array including a plurality of spaced parallel scan lines, a plurality of orthogonally arranged spaced parallel data lines, a plurality of contact pads adjacent to the periphery of the substrate that are electrically connected to said scan and data lines, an array of thin film transistors and pixel electrodes that are operationally associated with said scan lines and said data lines;
   forming at least one first electrostatic discharge line on said first substrate spaced outwardly from said pads;
   forming a plurality of light controlled electrostatic discharge devices adjacent said plurality of pads, each of said discharge devices having two terminals with one terminal joined to said discharge line and the other terminal joined to one of said pads;

electrically first testing said array while temporarily blocking out light from said discharge devices thereby making the devices non-conductive and isolating said discharge line from said pads;

forming a common electrode on a second glass substrate;

assembling said first substrate and said second substrate in closely spaced alignment;

illuminating said discharge devices to electrically short the line and pads, and injecting liquid crystal material in the space between said first and second substrates;

electrically second testing said array while temporarily blocking out light from said discharge devices thereby making the devices non-conductive and isolating said discharge line from said pads;

joining the pads to a suitable driver circuitry while illuminating said discharge devices; and permanently blocking light from said discharge devices to electrically isolate said discharge line and pads for operation of said panel.

16. The method of claim 15 wherein each of said light controlled electrostatic discharge devices include a stripe of silicon material, and a layer area of highly doped silicon material on each end of said stripe, and conductive metal terminals joined to said areas.

17. The method of claim 16 wherein both said stripe and layer areas are polycrystalline silicon.

18. The method of claim 16 wherein both said stripe and layer areas are amorphous silicon.

19. The method of claim 16 wherein said discharge device includes a photoconductor which when illuminated with light allows electrical conduction and when maintained dark does not allow electrical conduction.

20. The method of claim 15 wherein said discharge lines are formed simultaneously with said scan lines.

21. The method of claim 15 wherein said discharge lines are formed simultaneously with said pixel electrodes.

22. The method of claim 15 wherein said discharge line is formed simultaneously with said data lines.

23. The method of claim 16 and further comprising:
said at least one first discharge line includes a second discharge line that is formed on said first substrate that is spaced outwardly from the first discharge line, said second discharge line being connected to each of said pads; and removing said second discharge line before said first electrically testing said array;

said second discharge line serving to short said pads during fabrication of said thin film transistor array and thereby to eliminate damage to the array by electrostatic energy that is generated by the process steps.

24. The method of claim 23 wherein said second discharge line is removed by cutting the first substrate.

25. The method of claim 23 wherein each of said light controlled electrostatic discharge devices include a stripe of silicon material, and a later area of highly doped silicon material on each end of said stripe, and conductive metal terminals joined to said areas.

26. The method of claim 24 wherein both said stripe and layer areas are polycrystalline silicon.

27. The method of claim 24 wherein both said stripe and layer areas are amorphous silicon.

28. The method of claim 24 wherein said discharge device includes a photoconductor which when illuminated with light allows electrical conduction and when maintained dark does not allow electrical conduction.

29. The method of claim 22 wherein said discharge lines are formed simultaneously with said scan lines.

30. The method of claim 22 wherein said discharge lines are formed simultaneously with said pixel electrodes.

31. The method of claim 22 wherein said discharge line is formed simultaneously with said data lines.

32. The method of claim 15 wherein said at least one discharge line includes first and second discharge lines and said electrostatic discharge devices in the first line are shorted through a conductor stripe to said electrostatic discharge devices in the second line.

* * * * *